(12) United States Patent
Aizawa

(10) Patent No.: US 10,855,967 B2
(45) Date of Patent: Dec. 1, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Michio Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/942,032

(22) Filed: Mar. 30, 2018

(65) Prior Publication Data

US 2018/0288394 A1  Oct. 4, 2018

(30) Foreign Application Priority Data

Apr. 4, 2017  (JP) .................................. 2017-074830

(51) Int. Cl.
| | |
|---|---|
| *H04N 13/117* | (2018.01) |
| *H04N 5/247* | (2006.01) |
| *H04N 5/262* | (2006.01) |
| *H04N 5/272* | (2006.01) |

(52) U.S. Cl.
CPC ........... *H04N 13/117* (2018.05); *H04N 5/247* (2013.01); *H04N 5/2628* (2013.01); *H04N 5/2723* (2013.01)

(58) Field of Classification Search
CPC ................................................... H04N 5/2723
See application file for complete search history.

(56) References Cited

U.S. PATENT DOCUMENTS

| | | | | |
|---|---|---|---|---|
| 8,988,609 | B2* | 3/2015 | Zalewski | ................ G06K 9/62 |
| | | | | 348/588 |
| 9,992,553 | B2* | 6/2018 | Bennett | ................ H04N 21/812 |
| 2018/0041686 | A1* | 2/2018 | Bostick | ............. H04N 5/23225 |
| 2018/0262659 | A1* | 9/2018 | Hegde | ................... H04N 5/262 |

FOREIGN PATENT DOCUMENTS

| | | | | |
|---|---|---|---|---|
| JP | 5593356 B2 * | 9/2014 | ....... | H04N 21/23418 |
| JP | 5593356 B2 | 9/2014 | | |

* cited by examiner

*Primary Examiner* — Hsiungfei Peng
(74) *Attorney, Agent, or Firm* — Canon U.S.A., Inc. IP Division

(57) ABSTRACT

An image processing apparatus includes an obtaining unit configured to obtain identification information for identifying a restriction area which is set in a three-dimensional coordinate system, the restriction area being an area in which display of a virtual object inserted in a virtual viewpoint image based on captured images obtained by a plurality of cameras that capture images in different angles and viewpoint information corresponding to a specification of a virtual viewpoint is restricted, wherein the virtual object is not included in the captured images obtained by the plurality of cameras, and a control unit configured to restrict the display of the virtual object in the virtual viewpoint image so that the display of the virtual object being in the restriction area, which is identified by the identification information obtained by the obtaining unit, is restricted.

16 Claims, 12 Drawing Sheets

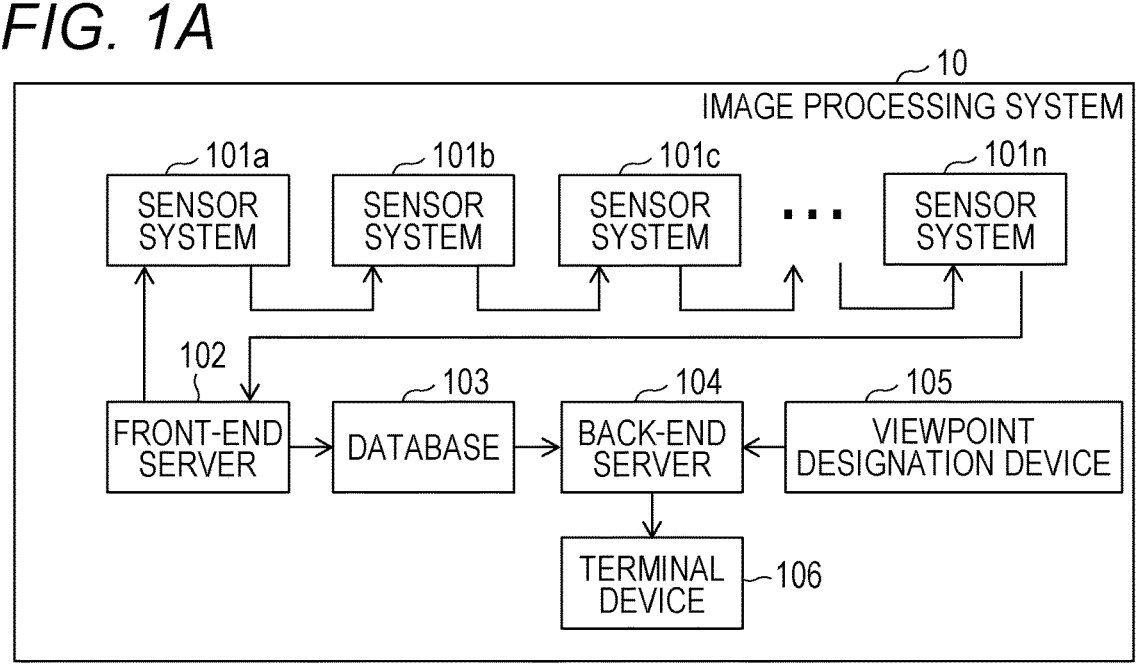
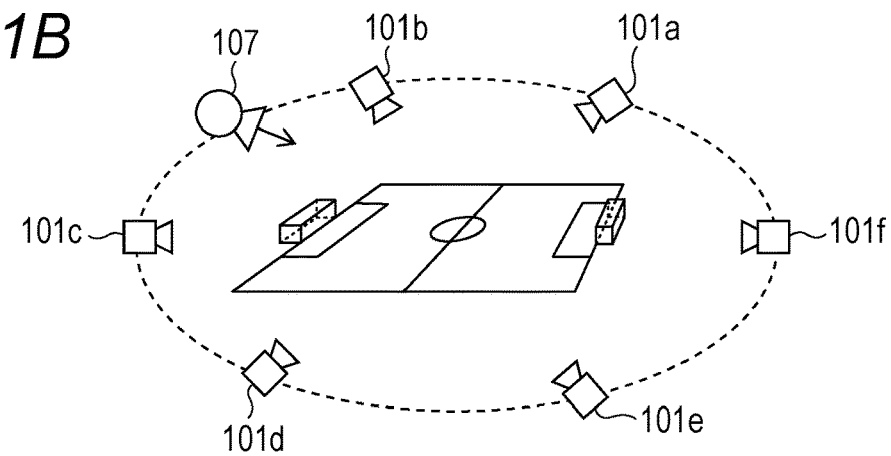
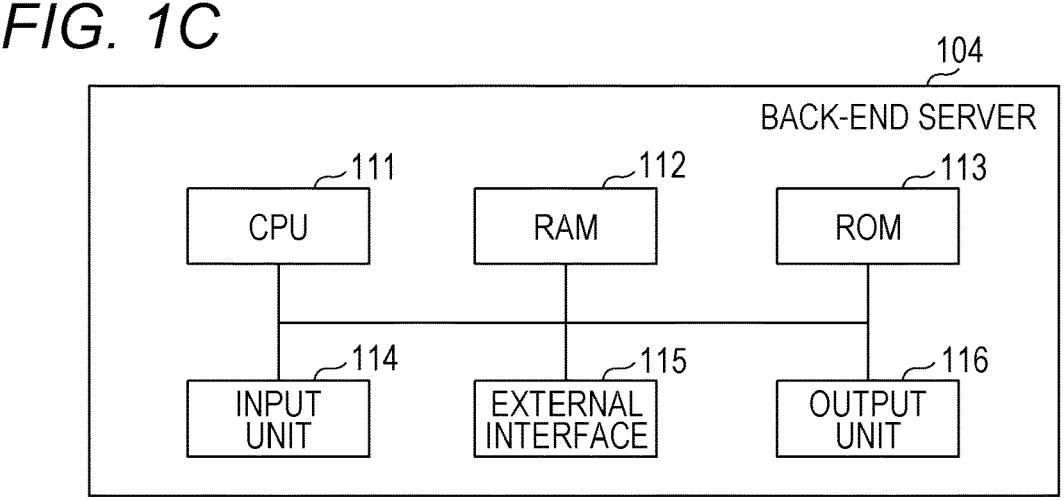

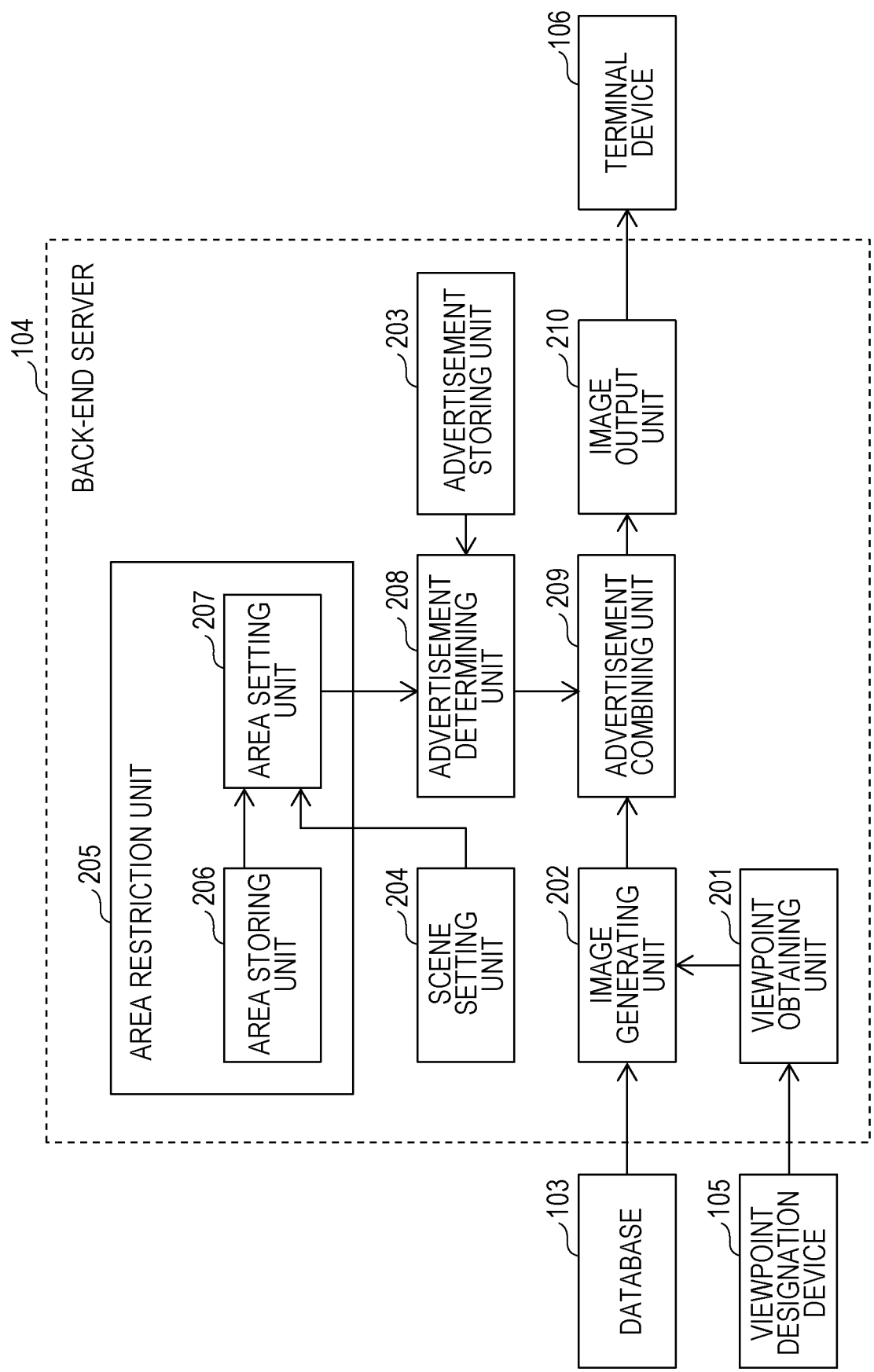

| ID | SCENE | RESTRICTION AREA |
|----|-------|------------------|
| 1 | IN-PLAY | (xa1,ya1,za1) – (xb1,yb1,zc1) |
| 2 | PK(A) | (xa2,ya2,za2) – (xb2,yb2,zc2) |
| 3 | PK(B) | (xa3,ya3,za3) – (xb3,yb3,zc3) |
| 4 | CK(A) | (xa4,ya4,za4) – (xb4,yb4,zc4) |
| ... | ... | ... |
| 10 | HALFTIME | (xa8,ya8,za8) – (xb8,yb8,zc8) |
| ... | ... | ... |

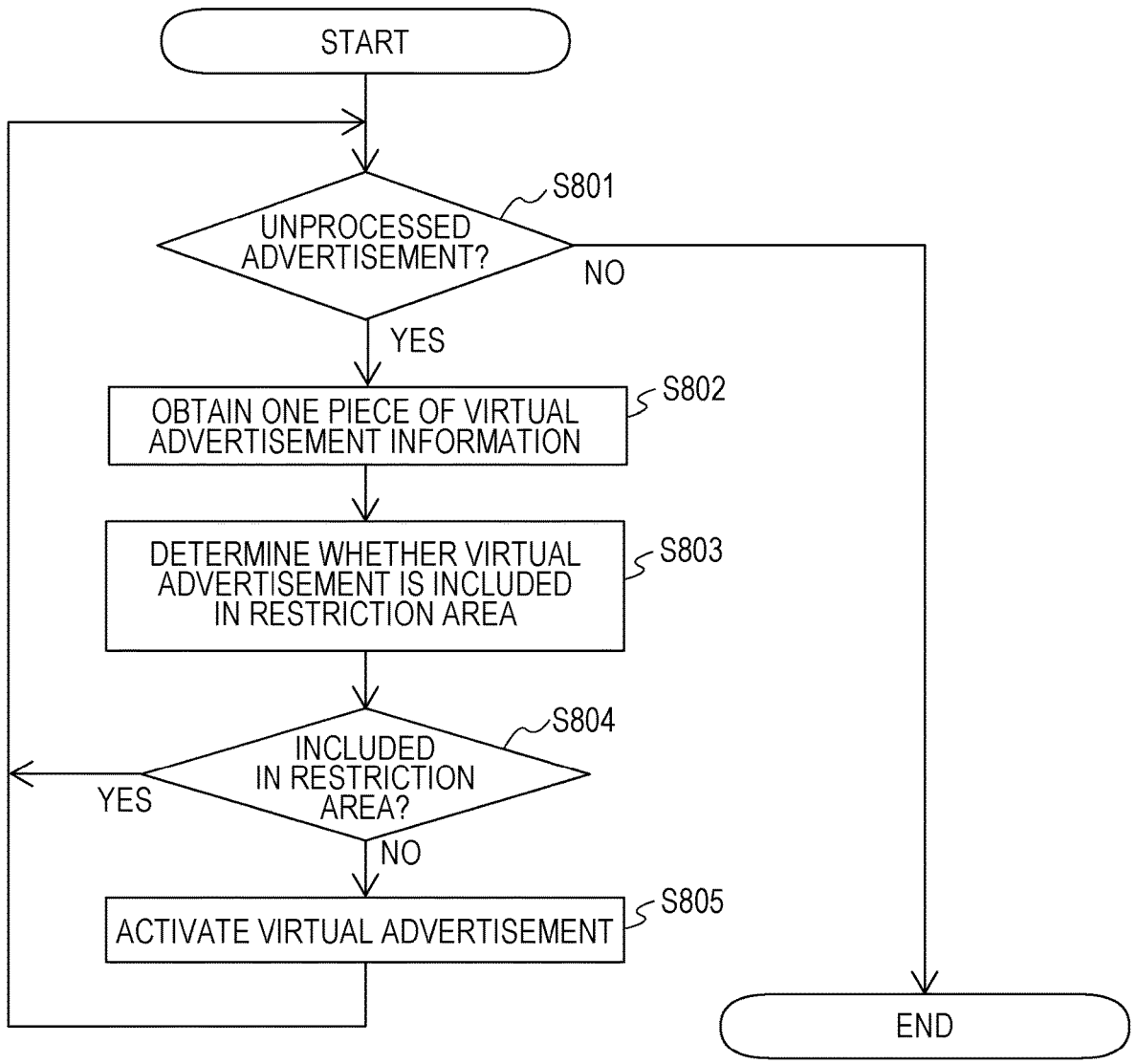

IMAGE PROCESSING APPARATUS, IMAGE PROCESSING METHOD, AND STORAGE MEDIUM

BACKGROUND

Field of the Disclosure

The present disclosure relates to a technique for generating a virtual viewpoint image.

Description of the Related Art

Conventionally, there has been proposed a technique for capturing images of a subject in different angles by a plurality of cameras placed in different positions and generating a virtual viewpoint image by using the plurality of captured images (multi-viewpoint images) obtained by capturing the images. The virtual viewpoint image generated in this manner is an image that expresses a view of a virtual viewpoint. With the technique for generating the virtual viewpoint image, for example, highlight scenes of a soccer game or a basketball game can be viewed from viewpoints in various angles and viewers can experience higher realistic sensations, compared to normal captured images.

Japanese Patent No. 5593356 describes that an advertisement as a virtual object, which is not included in multi-viewpoint images, is inserted and displayed in a virtual viewpoint image. Further, it is described that different advertisements are displayed according to specified virtual viewpoints.

However, according to the conventional techniques, a virtual object may be displayed in an inappropriate area in a virtual viewpoint image. For example, a highly important subject included in the virtual viewpoint image may be hidden by the virtual object. Further, for example, when the virtual object is placed near an area to get attention, this may disturb the viewer who is trying to focus on the area. Further, for example, when an area where a highly important subject is likely to move into is hidden by the virtual object, the condition of this area may become unclear to the user. Further, for example, when the virtual object is displayed in a wide area, it may be difficult to distinguish between the subject and the virtual object.

SUMMARY

An image processing apparatus includes an obtaining unit configured to obtain identification information for identifying a restriction area which is set in a three-dimensional coordinate system, the restriction area being an area in which display of a virtual object inserted in a virtual viewpoint image based on captured images obtained by a plurality of cameras that capture images in different angles and viewpoint information corresponding to a specification of a virtual viewpoint is restricted, wherein the virtual object is not included in the captured images obtained by the plurality of cameras, and a control unit configured to restrict the display of the virtual object in the virtual viewpoint image so that the display of the virtual object being in the restriction area, which is identified by the identification information obtained by the obtaining unit, is restricted.

Further features of the present disclosure will become apparent from the following description of exemplary embodiments (with reference to the attached drawings).

BRIEF DESCRIPTION OF THE DRAWINGS

FIGS. 1A to 1C are diagrams for explaining a configuration of an image processing system according to one or more aspects of the present disclosure.

FIG. 2 is a diagram for explaining a functional configuration of a back-end server according to one or more aspects of the present disclosure.

FIG. 8 is a flowchart for explaining a process related to a virtual advertisement display restriction by an advertisement determining unit according to one or more aspects of the present disclosure.

DESCRIPTION OF THE EMBODIMENTS

Figure 3A:
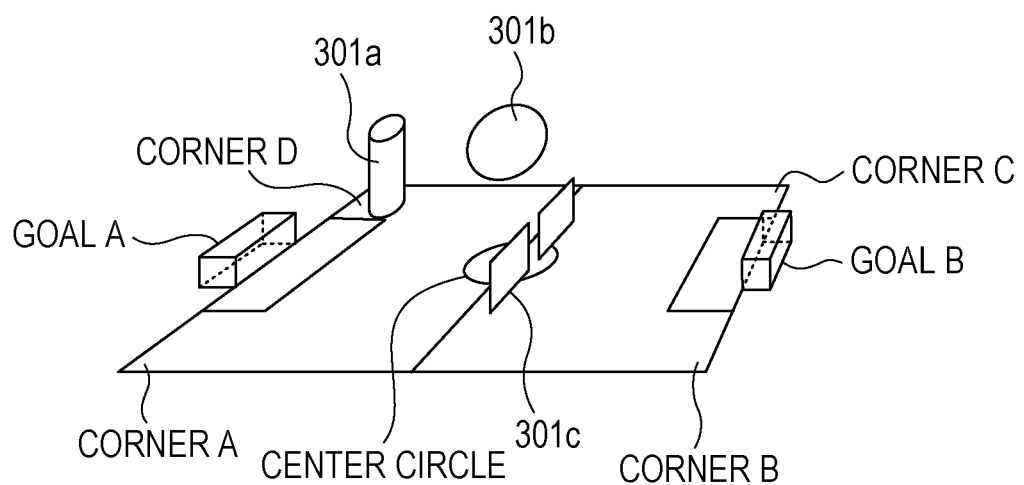
FIGS. 3A and 3B are diagrams for explaining an insertion of a virtual advertisement according to one or more aspects of the present disclosure.

In the following, an embodiment of the present disclosure will be described with reference to the drawings. Here, the embodiment described below is examples of a case that the present disclosure is executed, and the present disclosure is not limited to the embodiment.

[System Configuration]

FIG. 1A is a diagram for explaining an entire configuration of an image processing system 10 according to the present embodiment. The image processing system 10 includes n number of sensor systems including a sensor system 101*a*, a sensor system 101*b*, a sensor system 101*c*, ... and a sensor system 101*n*. According to the present embodiment, when it is not particularly needed to distinguish, the n number of sensor systems are simply referred to as a sensor system 101. The image processing system further includes a front-end server 102, a database 103, a back-end server 104, a viewpoint designation device 105, and a terminal device 106.

Each sensor system 101 includes a camera and a microphone. The plurality of cameras included in the plurality of sensor systems 101 respectively capture images, as synchronizing, from different directions. Further, the plurality of microphones of the plurality of sensor systems 101 respectively collect sounds in different directions. The front-end server 102 obtains a plurality of captured images (multi-viewpoint images) captured by the plurality of sensor systems 101 and sound data collected and generated by the plurality of sensor systems 101, and outputs the obtained captured images and sound to the database 103. Here, according to the present embodiment, the front-end server 102 obtains both of the plurality of captured images and the plurality of pieces of sound data via the sensor system 101n. However, it is not limited to this example and the front-end server 102 may obtain the captured images and sound data directly from each sensor system 101.

Further, the sensor system 101 may perform a process to cut a part of the captured images, and the front-end server 102 may obtain the cut images as a substitute for the captured images. Further, the sensor system 101 may perform a part of a process for generating a virtual viewpoint image (for example, a process for dividing the captured image into a foreground image corresponding to a certain subject and a background image corresponding to a part other than the foreground image). In this case, the sensor system 101 may transmit the foreground image to the front-end server 102 at a frame rate higher than that of the background image.

The database 103 stores the captured images and sound data input from the front-end server 102 and outputs the stored captured images and sound data to the back-end server 104 in response to a request from the back-end server 104. Here, in addition to the captured images itself, the database 103 may output data based on the captured images such as image data generated in image processing on the plurality of captured images to the back-end server 104. In the same manner, the database 103 may output data generated in sound processing to the back-end server 104.

The viewpoint designation device 105 receives an operation by an operator to specify a virtual viewpoint related to generation of a virtual viewpoint image and outputs viewpoint information corresponding to the specified virtual viewpoint to the back-end server 104. The back-end server 104 obtains necessary captured images and sound data from the database 103 according to the virtual viewpoint specified by the viewpoint information obtained from the viewpoint designation device 105 and performs a rendering process to generate virtual viewpoint images and virtual listening-point sound. The terminal device 106 obtains a virtual viewpoint image generated by the back-end server 104 and displays the image on a display unit. Further, the terminal device 106 obtains the virtual listening-point sound generated by the back-end server 104 and outputs the sound via a speaker. The terminal device 106 is a device in a broadcast station or a viewer's place for example, and is a personal computer or a smartphone in detail.

The virtual viewpoint image according to the present embodiment indicates an image obtained by capturing an image of the subject from a virtual point of view (virtual viewpoint). In other words, the virtual viewpoint image is an image from a specified view. The virtual viewpoint may be specified by the operator or may be automatically specified based on a result of an image analysis or the like. In other words, the virtual viewpoint image includes an arbitrary-viewpoint image (free-viewpoint image) corresponding to a viewpoint, which is arbitrary specified by the operator. Further, an image corresponding to a viewpoint specified by the operator from a plurality of options and an image corresponding to a viewpoint automatically specified by a device are also included in the virtual viewpoint image. Here, according to the present embodiment, when it is not mentioned, the expression of "image" includes both concepts of a moving image and a still image. In other words, the image processing system 10 according to the present embodiment can process both still images and moving images.

Further, the present embodiment mainly describes a case that the image processing system 10 generates a virtual listening-point sound that expresses the sound at a virtual listening point as well as the virtual viewpoint images; however, this example does not set any limitation. For example, the image processing system 10 may generate only virtual viewpoint images. In a purpose of simplifying the description, description related to sound processing will be partially omitted.

According to the present embodiment, to the virtual viewpoint image generated by the back-end server 104, a virtual object which is not included in the multi-viewpoint image captured by the sensor system 101 may be inserted. Here, the present embodiment describes a case that the virtual object is a virtual advertisement to display an advertisement in the virtual viewpoint image. Here, the virtual object is not limited to an advertisement. For example, as the virtual object, information related to a progress of a game and statistical information related to the game may be displayed, or a text or an image for explaining a player or a subject and biological information of the player may be displayed.

Here, according to the present embodiment, a user who operates the back-end server 104 and controls the display of the virtual object is distinguished from an operator who operates the viewpoint designation device 105 and designates the virtual viewpoint or a viewer who operates the terminal device 106 and views the virtual viewpoint image. It is noted that the user and the operator may be the same person, the user and the viewer may be the same person, or the user, the operator, and the viewer may all be a same person.

FIG. 1B illustrates an example that the plurality of sensor systems 101 are provided in a stadium. In FIG. 1B, six sensor systems 101 are provided as surrounding a soccer field in the stadium. A virtual camera 107 is a virtual camera that can capture an image from a virtual viewpoint, which is different from the viewpoints of any of the cameras included in the sensor system 101. In other words, the virtual viewpoint image generated in the image processing system 10 indicates an image captured by the virtual camera 107. Here, the subject to be captured by the sensor system 101 is not limited to a soccer game, and may be a different kind of game such as a rugby game, a sumo wrestling match, a live stage performance, or the like. Further, the plurality of sensor systems 101 may be placed to capture images of the subject such as a field or a stage in different angles but do not have to be placed all around the entire subject.

[Device Configuration]

FIG. 1C is a diagram for explaining a hardware configuration of the back-end server 104 according to the present embodiment. Here, configurations of other devices in the image processing system 10 are similar to that of the back-end server 104. It is noted that the sensor system 101 includes a microphone and a camera in addition to the following configuration. The back-end server 104 includes a CPU 111, a RAM 112, a ROM 113, an input unit 114, an external interface 115, and an output unit 116.

The CPU 111 controls the entire of the back-end server 104 by using a computer program and data stored in the RAM 112 or ROM 113. Here, the back-end server 104 may include one or more dedicated hardware or a graphics processing unit (GPU), which is different from the CPU 111, and the GPU or the dedicated hardware may perform a part of the processes by the CPU 111. As an example of the dedicated hardware, there are an application specific integrated circuit (ASIC), a field-programmable gate array (FPGA), and a digital signal processor (DSP), and the like. The RAM 112 temporarily stores the computer program or data read from the ROM 113, data supplied from outside via the external interface 115, and the like. The ROM 113 stores the computer program and data which do not need to be modified.

The input unit 114 is composed of, for example, a joystick, a jog dial, a touch panel, a keyboard, a mouse, or the like, and receives user's operation, and inputs various instructions to the CPU 111. The external interface 115 communicates with external device such as the database 103, viewpoint designation device 105, terminal device 106, and the like. The communication with the external devices may be performed by wire using a local area network (LAN) cable, a serial digital interface (SDI) cable, or the like, or may be performed wirelessly via an antenna. The output unit 116 is composed of, for example, a display unit such as a display and a sound output unit such as a speaker, and displays a graphical user interface (GUI) and outputs a guiding sound so that the user can operate the back-end server 104.

FIG. 2 is a block diagram for explaining a functional configuration of the back-end server 104 according to the present embodiment. The back-end server 104 includes a viewpoint obtaining unit 201, an image generating unit 202, an advertisement storing unit 203, a scene setting unit 204, an area restriction unit 205, an advertisement determining unit 208, an advertisement combining unit 209, and an image output unit 210. The area restriction unit 205 includes an area storing unit 206 and an area setting unit 207.

The viewpoint obtaining unit 201 obtains viewpoint information from the viewpoint designation device 105. The viewpoint information is information to identify a position and a posture of the (a position and a view direction of the virtual viewpoint) of the virtual camera 107. For example, the position of the virtual camera 107 is expressed with a coordinate value in a coordinate system that corresponds to a stadium as a subject, and the posture of the virtual camera 107 is expressed by using a rotation matrix.

The image generating unit 202 obtains a multi-viewpoint image captured by the sensor system 101 from the database 103 and generates a virtual viewpoint image corresponding to the viewpoint information obtained by the viewpoint obtaining unit 201. More specifically, the image generating unit 202 firstly obtains a three-dimensional shape or a position of a certain subject such as a player and a ball from the multi-viewpoint images captured by the sensor system 101. Next, the image generating unit 202 reconfigures an image of the certain subject based on the obtained three-dimensional shape and position, according to the viewpoint of the virtual camera 107, combines the images with a background image which indicates a field or the like, and generates a virtual viewpoint image.

The advertisement storing unit 203 stores information of the virtual advertisement as a virtual object which is inserted in the virtual viewpoint image. FIG. 3A illustrates an example in which a virtual advertisement is placed in a three-dimensional coordinate system corresponding to a soccer field in a stadium. The three-dimensional coordinate system according to the present embodiment is a coordinate system that defines a virtual three-dimensional space corresponding to an actual space. The advertisement 301a is a cylindrical-shaped virtual advertisement placed near a corner D. The advertisement 301b is a sphere-shaped virtual advertisement placed high above the center circle. The advertisement 301c is a plate-like virtual advertisement placed at the center circle. In this manner, virtual advertisements can be placed without interrupting the display of the game in the virtual viewpoint image, even at positions where the game may be interrupted in a real space if a sign or the like of an advertisement is placed. The information stored in the advertisement storing unit 203 is a position, a shape, a display content (image data), and the like of these virtual advertisements.

Figure 3B:
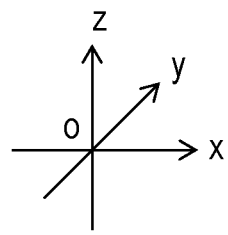

The position of the virtual advertisement is stored as a coordinate value in the coordinate system based on the subject such as the field in the stadium. For example, with the center of the center circle as an origin, a position of the virtual advertisement of a coordinate (X, Y, Z) in a space is defined by X-axis, Y-axis, and Z-axis as illustrated in FIG. 3B. Here, according to the present embodiment, the virtual advertisement is assumed to correspond to a fixed position which does not change according to the virtual viewpoint in the three-dimensional coordinate system. For example, the advertisement 301b is always placed just above the center circle. With this configuration, in the virtual viewpoint image, a virtual advertisement can be displayed as if it actually exists in the field without giving the viewers discomfort. Here, the virtual advertisement may move in a predetermined range in the three-dimensional coordinate system. The shape of the virtual advertisement is stored as a three-dimensional model, for example. The display content of the advertisement is stored as still image data or moving image data, for example. The position, shape and display content of these virtual advertisements are determined in advance by an organizer of the game, officials, and advertisement provider and stored in the advertisement storing unit 203.

The scene setting unit 204 sets a scene of a sport or an event captured by the plurality of sensor systems 101 to determine a virtual advertisement to be inserted in the virtual viewpoint image. For example, the input unit 114 of the back-end server 104 accepts user's operation of specifying a scene of the sport, and the scene setting unit 204 sets the scene based on the accepted operation. More specifically, the scene setting unit 204 sets a proper scene based on the user's operation performed corresponding to the progress of the game, from the options of the predetermined plurality of scenes. The options of the predetermined scenes differ in each sport. For example, in a case where the sport to be captured is soccer game, "in-play," "CK (corner kick)," "PK (penalty kick)" and the like can be the options of the scene. In a case of basketball game, "in-play," "free throw," and the like can be the options of the scene.

Figure 4:
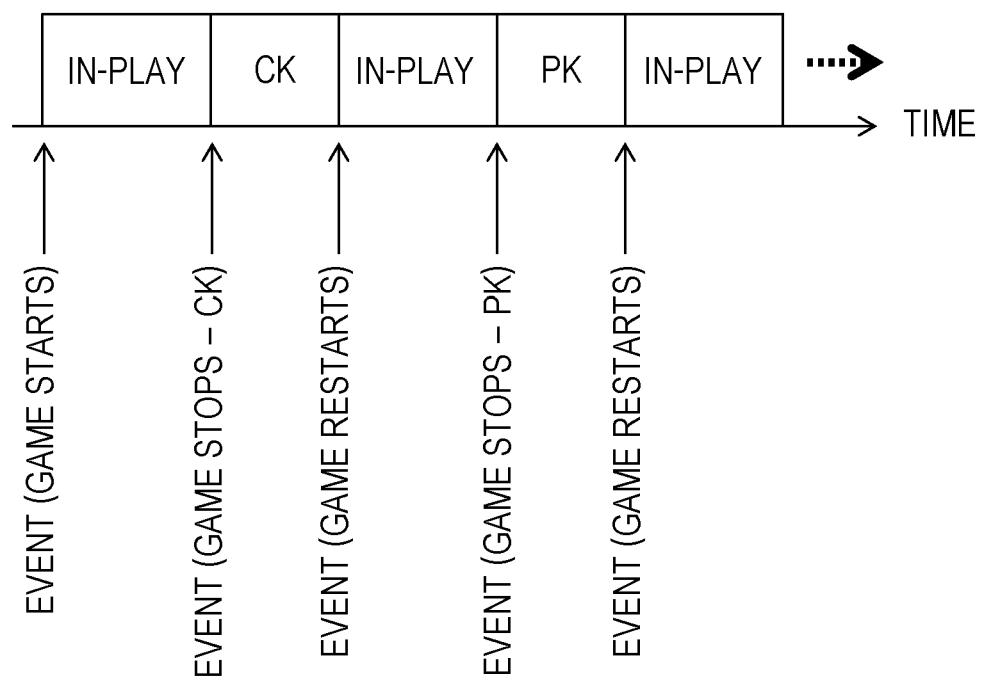
FIG. 4 is a diagram for explaining scene settings according to one or more aspects of the present disclosure.

The scene setting unit 204 displays a list of the options of the scene on the output unit 116, for example. The user specifies a proper scene corresponding to the progress of the game via the input unit 114. The scene setting unit 204 sets a new scene based on the user's specification. FIG. 4 illustrates an example of scene settings. Firstly, the game starts according to a sign by a referee. When the user specifies "in-play" via the input unit 114, the scene setting unit 204 sets "in-play" as the scene to be captured at the timing. When the ball crosses the goal line, the referee calls a corner kick, and the user specifies "CK" via the input unit 114, the scene setting unit 204 sets "CK" as the scene at the timing. When the referee calls to restart the game and the user specifies "in-play" via the input unit 114, the scene setting unit 204 sets "in-play" as the scene at the timing. In the following, the similar processes are performed until the game ends. Here, the scene settings may be automatically performed according to a result of a moving image analysis and/or a sound analysis.

The area restriction unit 205 sets a restriction area 501 in which a display of an area where the display related to the game is performed prior to the display of a virtual advertisement, that is, an area where the display of the virtual advertisement is restricted, in a virtual three-dimensional coordinate system, corresponding to the scene set by the scene setting unit 204. The display related to the game here is a display of a certain subject in the real space, such as a player, a ball, a goalpost, or the like. Although the details of the display restriction performed on the set restriction area 501 will be described later, the virtual advertisement placed inside the restriction area 501 is not displayed for example. By setting the restriction area 501 where the display of the virtual advertisement is restricted, the back-end server 104 helps to avoid a case that a highly important subject such as a player and a ball included in the virtual viewpoint image is hidden behind the virtual advertisement. Further, by setting the restriction area 501, it is helpful to prevent a case that the virtual advertisement is placed near an area to be focused and disturb the viewer to concentrate on the area.

Figure 5A:
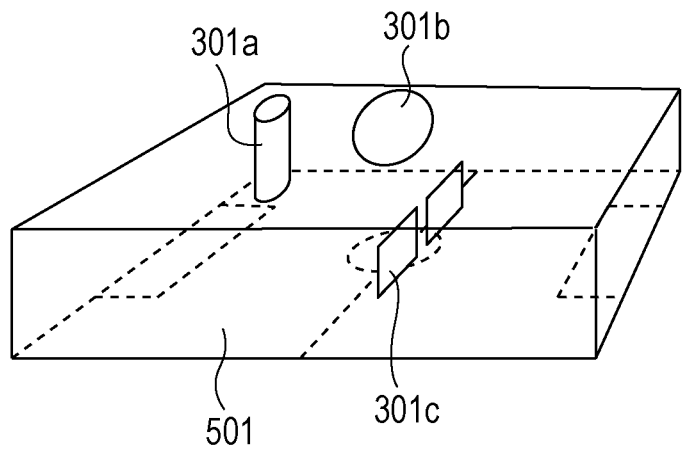
FIGS. 5A to 5C are diagrams for explaining a restriction area according to one or more aspects of the present disclosure.
Figure 5B:
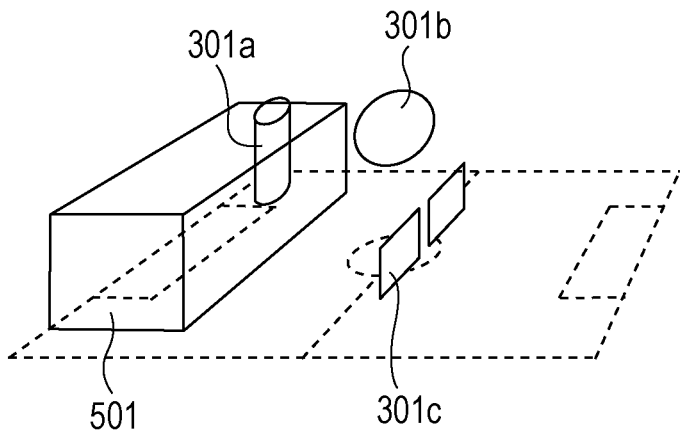
Figure 5C:
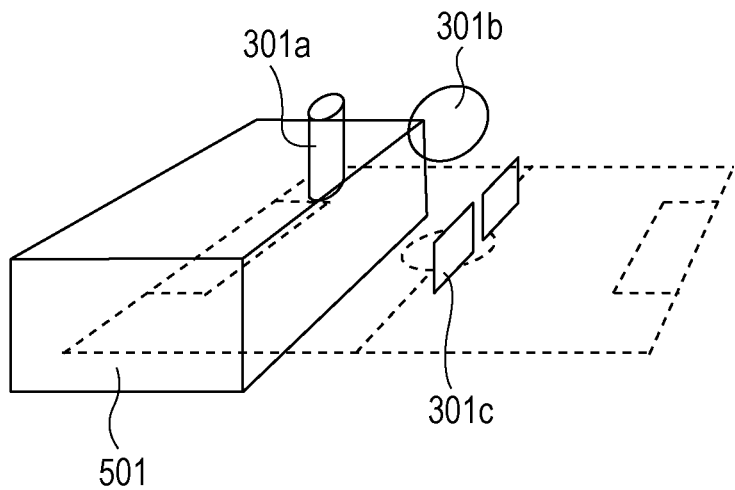

FIGS. 5A to 5C illustrate examples of the restriction area 501. FIG. 5A illustrates an example in which an area that includes the entire field is set as the restriction area 501. FIG. 5B illustrates an example in which an area near the goal A of FIG. 3A is set as the restriction area 501. FIG. 5C illustrates an example in which an area that includes the corner A and the goal A is set as the restriction area 501. Here, in the examples of FIGS. 5A to 5C, the restriction area 501 is set in a cuboid shape; however, the shape of the restriction area 501 is not limited to the examples and may be in an elliptic-column shape or other shapes for example.

Figures 6A, 6B:
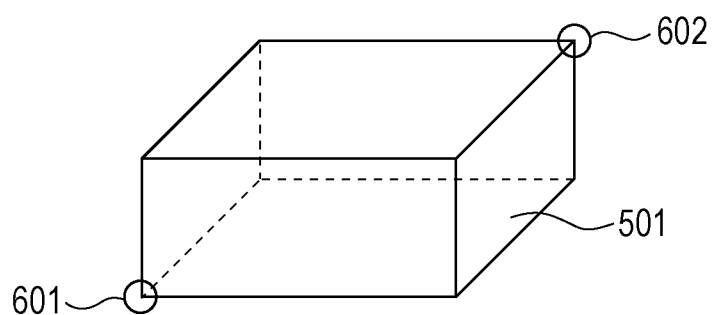
FIGS. 6A and 6B are diagrams for explaining area information related to the restriction area according to one or more aspects of the present disclosure.

The area storing unit 206 included in the area restriction unit 205 stores area information related to an area to be an option of the restriction area 501. FIG. 6A is an example of area information that associates the respective scenes with areas as the options of the restriction area 501. The scene "PK(A)" represents a penalty kick in the goal A side of FIG. 3. The scene "PK(B)" represents a penalty kick in the goal B side. The scene "CK(A)" represents a corner kick in the corner A. The areas as the options of the restriction area 501 is indicated with a coordinate in the three-dimensional coordinate system between the vertex 601 and vertex 602 placed in the opposing corners of the cuboid-shaped area as illustrated in FIG. 6B, for example.

As the correspondence between the restriction area 501 and each scene illustrated in FIGS. 5A to 5C, for example, the restriction area 501 corresponding to the scene "in-play" is the area illustrated in FIG. 5A. This is because the player and the ball may move in a wide area in the field when the ball is in-play. Further, the restriction area 501 corresponding to the scene "PK(A)" is the area illustrated in FIG. 5B. This is because, in the case of PK, the players and the ball to be focused gather near the goal and the visibility of the virtual viewpoint image for the viewer is not affected even when subjects in other areas are hidden behind the virtual advertisement. Further, the restriction area 501 corresponding to the scene "CK(A)" is the area illustrated in FIG. 5C. This is because, in a case of CK, the player and the ball to be focused gather near the goal.

In this manner, the restriction area 501 to be set may differ according to whether the sport scene to be captured by the plurality of sensor systems 101 is a set play such as "PK" and "CK." Further, the restriction area 501 to be set differs according to a type of the set play as the sport scene. The type of the sport is not limited to soccer and, also in case of rugby for example, the restriction area 501 may be set according whether it is a set play or the type of the set play. Since the restriction area 501 is determined in this manner, the display of a virtual advertisement can be restricted in an area that the viewer particularly focuses such as an area where the player moves a lot and an area where the ball exists. As a result, a virtual advertisement can be displayed in the virtual viewpoint image, as preventing the reduction of visibility of the virtual viewpoint image for the viewer. Here, the association between the scenes and restriction areas 501, the options of scenes to be specified, and the options of the restriction area 501 are not limited to the above examples.

The area setting unit 207 included in the area restriction unit 205 obtains identification information that identifies a scene from the scene setting unit 204, refers to the obtained identification information and the area information stored in the area storing unit 206, and sets the restriction area 501. For example, when the scene setting unit 204 sets "in-play" as the scene, the area setting unit 207 sets the restriction area 501 illustrated in FIG. 5A. In other words, the area setting unit 207 obtains the identification information that indicates a scene as information to identify the restriction area 501 to be set.

It is noted that the restriction area 501 is not limited to an area which is set based on the scene to be captured. For example, the area restriction unit 205 may show a plurality of option areas which are the predetermined options of the restriction area 501 to the user via the output unit 116, and set the restriction area 501 based on the user's operation to determine a restriction area 501 from those option areas. In other words, the area restriction unit 205 may obtain information to identify the area selected by the user as identification information that identifies the restriction area 501 to be set.

Further, for example, the area restriction unit 205 may set an area which is directly specified by the user by using a mouse or the like included in the input unit 114 as the restriction area 501. In other words, the area restriction unit 205 may obtain information that indicates a coordinate of an area specified by the user as identification information that identifies the restriction area 501 to be set. It is noted that, in this case, the user may specify a position of the restriction area 501 in the three-dimensional coordinate system or a position of the restriction area 501 in a two-dimensional coordinate system corresponding to the field, for example. More specifically, the area restriction unit 205 may show an image right above the field to the user via the output unit 116, and set a restriction area 501 based on user's operation to specify a position (a position in a two-dimensional coordinate system) of the field. When the user specifies a position in the two-dimensional coordinate system, a predetermined value and a value corresponding to a dimension of the restriction area 501 in the two-dimensional coordinate system may be set as a height of the restriction area 501 in the three-dimensional coordinate system.

Further, for example, the user specifies a virtual advertisement to restrict to be display via the input unit 114, and the area restriction unit 205 sets an area corresponding to the virtual advertisement specified by the user as a restriction area 501. Further, the area restriction unit 205 may obtain identification information that indicates an allowance area in which the display of the virtual advertisement is allowed, contrary to the information that indicates a restriction area 501. Then, the area restriction unit 205 may set a restriction area 501 and/or an allowance area based on the obtained identification information.

Here, the restriction area 501 can be easily set in a method for selecting a restriction area 501 from a plurality of option areas and a method for specifying a scene, compared to a method for directly specifying a restriction area 501. On the other hand, the restriction area 501 can be more specifically set in a method for directly specifying a restriction area 501. Thus, the area restriction unit 205 may be configured so that the method for setting a restriction area 501 can be switched. For example, in a case that the virtual viewpoint images generated from the multi-viewpoint images real time are broadcasted live, the area restriction unit 205 may perform a display control so that the user can select a restriction area 501 from a plurality of options. In addition, in a case that the virtual viewpoint images based on recorded multi-viewpoint images are generated, the area restriction unit 205 may perform a display control so that the user can directly specify a restriction area 501.

The advertisement determining unit 208 determines whether to validate or invalidate each of the virtual advertisement corresponding to the information stored in the advertisement storing unit 203 according to the restriction area 501 set by the area restriction unit 205. More specifically, the virtual advertisement corresponding to the position inside the restriction area 501 is determined to be invalid and the virtual advertisement corresponding to the position outside the restriction area 501 is determined to be valid. The virtual advertisement, which is determined to be valid, is set as a target to be displayed and, when the position of the virtual advertisement is included in the view of the virtual viewpoint, the virtual advertisement is displayed in the virtual viewpoint image. On the other hand, the virtual advertisement, which is determined to be invalid, is not set as a target to be displayed, the advertisement is not displayed in the virtual viewpoint image even when the position of the virtual advertisement is included in the view of the virtual viewpoint.

With reference to FIGS. 5A to 5C, the illustrative examples are explained. In the example of FIG. 5A, all of the advertisement 301a, advertisement 301b, and advertisement 301c are included in the restriction area 501. Thus, all virtual advertisements are determined to be invalid (not to be displayed). In the example of FIG. 5B, only the advertisement 301a is included in the restriction area 501. Thus, the advertisement 301b and advertisement 301c which are not included in the restriction area 501 are determined to be valid. In the example of FIG. 5C, there is no virtual advertisement included in the restriction area 501. Thus, all the virtual advertisements are determined to be valid.

The advertisement combining unit 209 combines an image of the virtual advertisement, which is determined to be valid by the advertisement determining unit 208, to the virtual viewpoint image generated by the image generating unit 202. The image of the combined virtual advertisement is an image which is converted from an image of display content of the virtual advertisement stored in the advertisement storing unit 203 into an image viewed from the virtual camera 107. More specifically, a conversion by using a perspective projection matrix in which the position and posture of the virtual camera 107 are determined is performed. The position where the virtual advertisement is combined corresponds to a position of the virtual advertisement stored in the advertisement storing unit 203.

Thus, the virtual advertisement is inserted and displayed in the virtual viewpoint image as if the advertisement is placed in the field in the real space. As a result, the subject placed in front of the virtual advertisement as seen from the virtual camera 107 hides a part of or the entire virtual advertisement. On the other hand, a part or the entire of the subject placed behind the virtual advertisement as seen from the virtual camera 107 is hidden by the virtual advertisement. Here, the virtual advertisement combined in the virtual viewpoint image is only a virtual advertisement which is placed in the viewing angle (the view of the virtual viewpoint) of the virtual camera 107. A virtual advertisement, which is determined to be valid, is not combined when the virtual advertisement is not placed in the viewing angle of the virtual camera 107. Further, a virtual advertisement, which is determined to be invalid, is not combined even when the virtual advertisement is placed in the viewing angle of the virtual camera 107.

As described above, the advertisement combining unit 209 restricts the display of the virtual advertisements inside the restriction area 501, based on whether each virtual advertisement is determined to be valid by the advertisement determining unit 208. Here, as a method for restricting the display of the virtual advertisements in the virtual viewpoint image, the present embodiment will focus on a case that a display restriction is performed so that the virtual advertisements placed inside the restriction area 501 are not displayed in the virtual viewpoint image. However, the content of the display restriction is not limited to this example as long as a process to make the virtual advertisement as a target of the display restriction to be indistinctive is performed. For example, the advertisement combining unit 209 may control a transparency and a size of the virtual advertisements based on whether each virtual advertisement is determined to be valid by the advertisement determining unit 208.

More specifically, the advertisement combining unit 209 may convert the image of the virtual advertisement to be combined so that the transparency level of the virtual advertisement placed inside the restriction area 501 becomes greater than the transparency level of the virtual advertisement which is not in the restriction area 501. Further, the advertisement combining unit 209 may convert the image of the virtual advertisement to be combined so that the size of the virtual advertisement placed inside the restriction area 501 becomes smaller than the size of the virtual advertisement which is not in the restriction area 501. Such a content of the display restriction can reduce a case that a highly important subject is hidden by a virtual advertisement or a case that the viewer is disturbed to concentrate on an area to be focused. Further, the effect of the advertisement can be improved, compared to a case that the display restriction for stopping the display of the virtual advertisements is performed.

The image output unit 210 outputs, to the terminal device 106, the virtual viewpoint image to which the virtual advertisement is combined by the advertisement combining unit 209. It is noted that, according to the present embodiment, all of the area restriction unit 205 that sets a restriction area 501, the advertisement determining unit 208 that determines a virtual advertisement of which display is to be restricted, and the advertisement combining unit 209 that generates a virtual viewpoint image corresponding to the display restriction of the virtual advertisement are included in the back-end server 104. However, this example does not set any limitation and, for example, the image generating unit 202 and advertisement combining unit 209 may be provided inside an image generation device, which is different from the back-end server 104. In this case, the advertisement determining unit 208 may restrict the display of the virtual advertisement by outputting, to the image generation device, at least one of information related to whether there is a display of the virtual advertisement and a parameter related to the display of the virtual advertisement. Here, the parameter related to the display of the virtual advertisement is, for example, a parameter that indicates a level of the transparency of the virtual advertisement, a parameter that indicates the size of the virtual advertisement, and the like. Further, the database 103, the viewpoint designation device 105, and the like may be integrally composed with the back-end server 104.

[Operation Flow]

Figure 7:
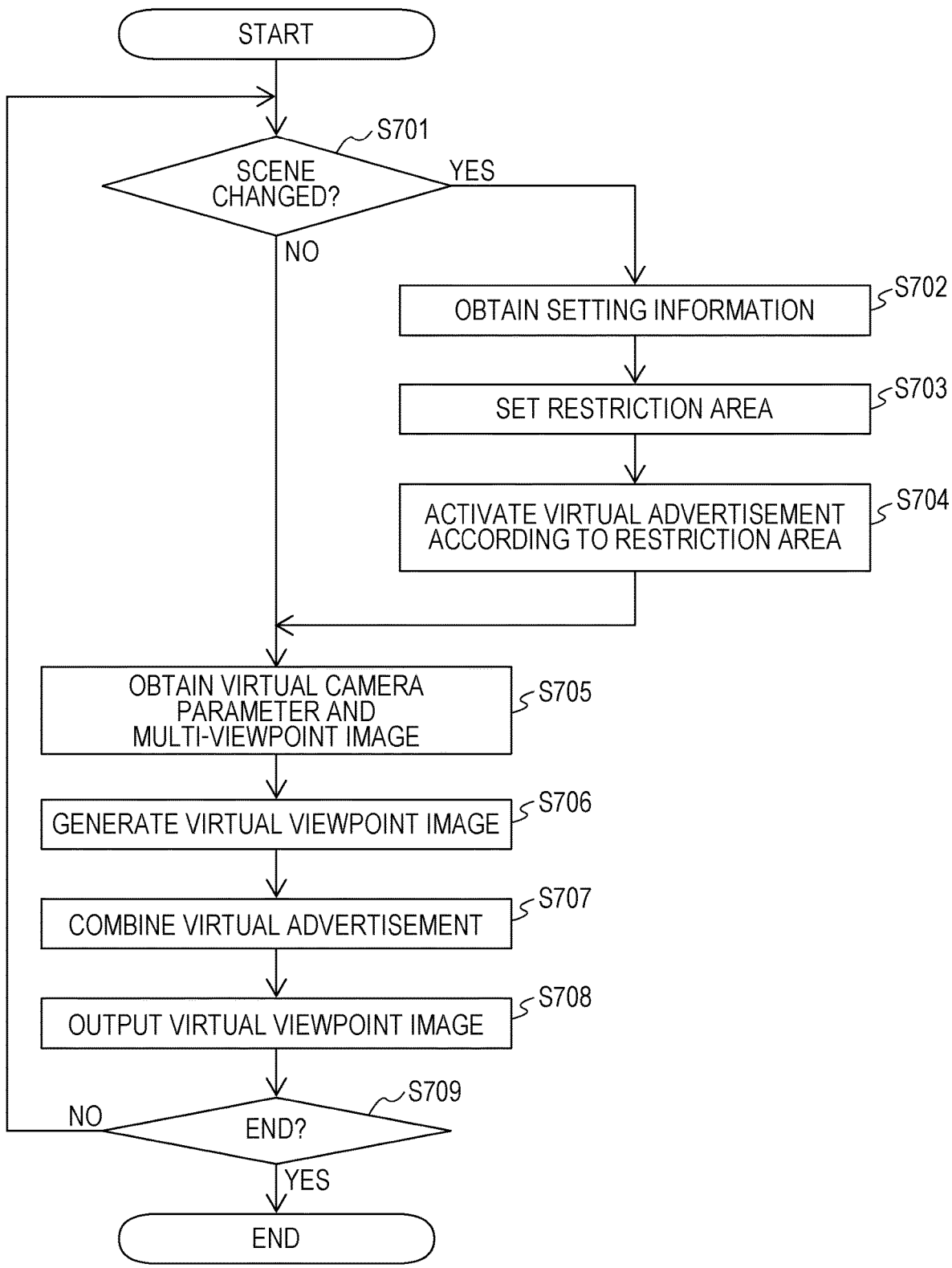
FIG. 7 is a flowchart for explaining a process by the back-end server according to one or more aspects of the present disclosure.

Next, with reference to FIG. 7, a process procedure in the back-end server 104 according to the present embodiment will be described. The process illustrated in FIG. 7 starts at a timing when the input unit 114 accepts an operation by the user to start generating a virtual viewpoint image. The user's operation is performed, for example, according to a start of a game, which is a target to be captured by the sensor system 101. Here, the generating of the virtual viewpoint image is not limited to a real-time performance and, for example, the generation of the virtual viewpoint image may be started after the game has finished, based on captured images, which are recorded during the game. The process illustrated in FIG. 7 is realized by that the CPU 111 develops and executes programs, which are stored in the ROM 113, in the RAM 112. Here, at least a part of the process illustrated in FIG. 7 may be realized by one or more dedicated hardware or GPU, which is different from the CPU 111.

In S701, the scene setting unit 204 determines whether the scene to be captured has changed. More specifically, when the user's operation to specify a new scene is performed, it is determined that the scene has changed, a new scene is set, and the process proceeds to S702. When the scene has not changed, the process proceeds to step S705. Here, when the scene specification has not performed, a default scene is set and the process proceeds to S702. Further, the scene determination does not always have to be performed in response to user's operation. In other words, the determination whether the scene has changed may be executed according to a result of a moving image analysis and/or a sound analysis. In S702, the area restriction unit 205 obtains, from the scene setting unit 204, identification information that indicates scene setting as information to identify a restriction area 501, and obtains, from the area storing unit 206, information of the restriction area 501 corresponding to the set scene. In S703, the area setting unit 207 sets the restriction area 501 corresponding to the set scene. The restriction area 501 is an area set in a three-dimensional coordinate system and an area in which a display of virtual objects is restricted.

In S704, the advertisement determining unit 208 determines whether each virtual advertisement corresponding to the information stored in the advertisement storing unit 203 is set valid. With this configuration, the virtual advertisement as a displayed target is changed. More specifically, the display of the virtual advertisement placed inside the set restriction area 501 is restricted and the virtual advertisement is not displayed in the virtual viewpoint image. Here, the transparency or size of the virtual advertisement may be changed without stopping the display of the virtual advertisement. When the transparency or the size is changed, the level of the transparency or the level of reduction is determined in S704.

In S705, the viewpoint obtaining unit 201 obtains, from the viewpoint designation device 105, the viewpoint information corresponding to the specification of the virtual viewpoint. Further, the image generating unit 202 obtains, from the database 103, a plurality of captured images obtained by performing image capturing by the plurality of sensor systems 101 respectively in different angles. In S706, the image generating unit 202 generates a virtual viewpoint image by using the obtained viewpoint information and the plurality of captured images. In S707, the advertisement combining unit 209 combines an image of a virtual advertisement which is determined to be valid in S704 to the generated virtual viewpoint image. In S708, the image output unit 210 outputs, to the terminal device 106, the virtual viewpoint image to which the virtual advertisement is inserted. Here, when there is no virtual advertisement which is determined to be valid in S704, the process in S707 is not executed.

In S709, the back-end server 104 determines whether to end the generation of the virtual viewpoint image. For example, the back-end server 104 determines to end the generation when user's operation of pressing an "end" button displayed on the display of the output unit 116 is accepted. When it is determined not to end the generation of the virtual viewpoint image, the process returns to S701 and the generation of the virtual viewpoint image continues.

Next, with reference to FIG. 8, the procedure of the process related to the display restriction of the virtual advertisement will be described further in detail. FIG. 8 illustrates a detailed flow of the process in S704 of FIG. 7. In S801, the advertisement determining unit 208 determines whether there is a piece of unprocessed information in the information of virtual advertisements stored in the advertisement storing unit 203. When there is a piece of unprocessed information, the process proceeds to step S802. When the information of all virtual advertisements has been processed, the process ends and proceeds to step S705.

In S802, the advertisement determining unit 208 obtains one piece of information of the unprocessed virtual advertisement from the advertisement storing unit 203. In S803, the advertisement determining unit 208 determines whether a position of the virtual advertisement corresponding to the obtained information is included in the set restriction area 501. This determination is performed by referring to the coordinate of the restriction area 501 and the coordinate of the virtual advertisement. In S804, the process diverges according to the determination result in S803. When it is determined that the virtual advertisement is included in the restriction area 501 in S803, it is determined that the virtual advertisement is invalid and processed, and the process returns to S801. When it is determined that the virtual advertisement is not included in the restriction area 501, the process proceeds to S805 and it is determined that the virtual advertisement is valid and processed, and the process returns to S801.

[Example of Virtual Viewpoint Image]

Figure 9A:
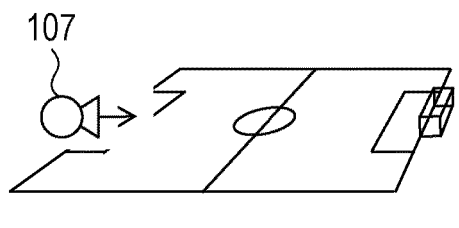
FIGS. 9A and 9F are diagrams for explaining an examples of a virtual viewpoint image to which a virtual advertisement is inserted according to one or more aspects of the present disclosure.
Figure 9D:
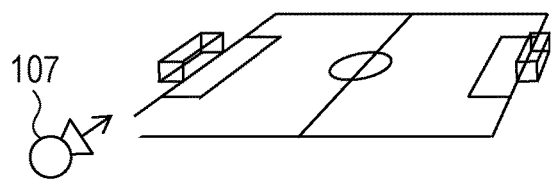
Figure 9B:
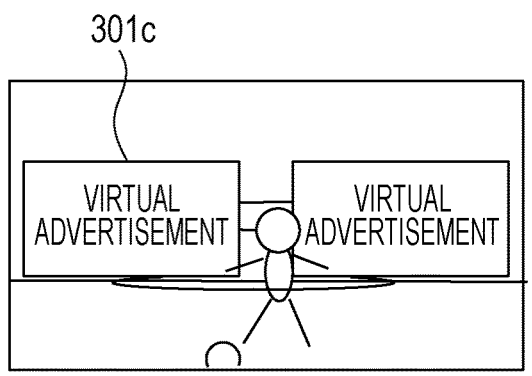
Figure 9E:
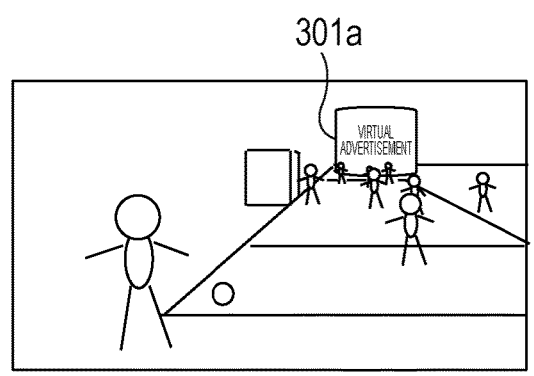
Figure 9C:
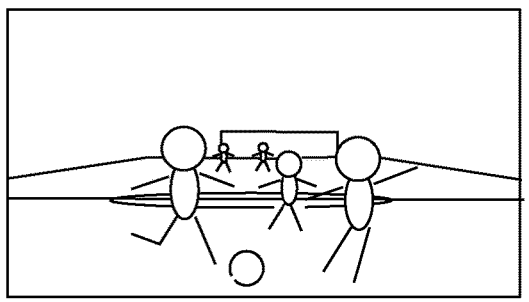

FIGS. 9A to 9F are examples of a virtual viewpoint image to which a virtual advertisement is inserted. In this example, it is assumed that the information of three virtual advertisements of the advertisement 301a, advertisement 301b, and advertisement 301c illustrated in FIG. 3A are stored in the advertisement storing unit 203. FIGS. 9B and 9C are both virtual viewpoint images corresponding to the virtual camera 107 of FIG. 9A.

FIG. 9B illustrates a virtual viewpoint image corresponding to a viewpoint toward a player who is trying to kick a ball seen from a goalkeeper in a scene of "PK(A)." Here, a restriction area 501 illustrated in FIG. 5B is set, and the advertisement 301b and advertisement 301c, which are not included in the restriction area 501, are determined to be valid. Among the virtual advertisements, which are determined to be valid, the advertisement 301c placed in the viewing angle of the virtual camera 107 is combined to the virtual viewpoint image. On the other hand, since the advertisement 301b is not placed in the viewing angle of the virtual camera 107, the advertisement 301b is not combined. In the PK scene, the player who kicks the ball, the goalkeeper, and the goal are highly important subjects. Thus, even when the virtual advertisement is inserted near the center circle, the viewing by the viewer is not disturbed. In other words, as illustrated in FIG. 9B, even when the virtual advertisements are displayed behind the player who kicks the ball in the virtual viewpoint image corresponding to the viewpoint from the goalkeeper, the viewing is not disturbed. On the other hand, FIG. 9C is a virtual viewpoint image corresponding to the viewpoint of the goalkeeper in the "in-play" scene. Here, the restriction area 501 illustrated in FIG. 5A is set and there is no virtual advertisement which is determined to be valid and any virtual advertisement is not combined to the virtual viewpoint image.

Figure 9F:
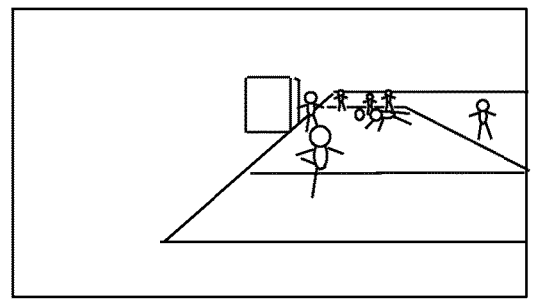

FIGS. 9E and 9F are both virtual viewpoint images corresponding to the virtual camera 107 of FIG. 9D. FIG. 9E is a virtual viewpoint image corresponding to a viewpoint of a player who is trying to kick the ball seen from behind the player in the "CK(A)" scene. In this example, the restriction area 501 illustrated in FIG. 5C is set, the advertisement 301a, advertisement 301b, and advertisement 301c, which are not included in the restriction area 501, are determined to be valid. The advertisement 301a, which is placed in the viewing angle of the virtual camera 107 among the virtual advertisements which are determined to be valid, is inserted near the corner D. Since the advertisement 301b and advertisement 301c are not placed in the viewing angle of the virtual camera 107, the advertisement 301b and advertisement 301c are not combined. In the CK scene, the player who kicks the ball and the players near the goal are highly important subjects. Thus, even when a virtual advertisement is combined at the corner opposite from the ball, viewing of the viewer is not disturbed. On the other hand, FIG. 9F is a virtual viewpoint image corresponding to the viewpoint seen from the corner in the "in-play" scene. In this example, the restriction area 501 illustrated in FIG. 5A is set, there is no virtual advertisement which is determined to be valid and any virtual advertisement is not combined to the virtual viewpoint image.

Here, the above description focuses on a case that the restriction area 501 is set according to the scene specification by the user; however, this example does not set any limitation and the restriction area 501 may be automatically set or adjusted. For example, the scene setting unit 204 may have a configuration that a scene is recognized from a captured image or sound data obtained by the sensor system 101. The method for recognizing a scene may be, for example, a method such as GMM supervectors, which is an image analysis process for extracting a characteristic amount from a captured image, the bag of visual words, and the like. However, the scene recognition method is not limited to these examples. The area restriction unit 205 obtains information that indicates a scene recognized by the scene setting unit 204 in the image analysis process, as identification information for identifying a restriction area 501 and sets the restriction area 501. With this configuration, a process by a user to specify a scene can be omitted.

The scene setting unit 204 sets a scene according to a sign by the referee for example. More specifically, when it is recognized that the referee calls a corner kick, "CK" is set as a scene. Further, when it is recognized that the referee calls to restart the game, "in-play" is set as a scene. Here, the scene setting unit 204 may set different timings as a timing for identifying a scene and a timing for setting a scene. For example, when the scene is "CK," the scene setting unit 204 may set a scene of "in-play" at a timing that it is recognized that the player who performs a corner kick has moved without setting the scene of "in-play" soon after it is recognized that the referee calls to restart the game. Further, the scene of "in-play" may be set at a timing when it is recognized that the ball placed at the corner is kicked. By deciding the timing to set the scene in this manner, the virtual advertisement can be displayed for a longer period of time while suppressing a reduction of visibility of the virtual viewpoint image for a viewer. Further, the scene setting unit 204 may set different timings to set scenes according to an advertisement rate of the virtual advertisement.

Further, the area restriction unit 205 may automatically adjust the set restriction area 501 based on user's operation or an image analysis by the scene setting unit 204. For example, the area restriction unit 205 obtains a captured image from the database 103, performs an image analysis for extracting a characteristic amount from the captured image, and detects a certain subject in the captured image. The certain subject to be detected may be determined in advance or may be determined according to the scene. For example, in a "FK (free kick)" scene, the ball in the field is detected as the certain subject.

Then, the area restriction unit 205 dynamically sets a restriction area 501 according to the position of the detected subject. The setting method may differ for each scene. For example, in the "FK" scene, an area from the recognized ball to the goal line is set as the restriction area 501. As an example illustrated in FIGS. 10A and 10B, the restriction area 501 is determined according to the position of the detected ball 1101. With this configuration, a virtual advertisement can be displayed as suppressing the reduction of visibility of the virtual viewpoint image for the viewer even in a case of a scene such as a free kick in which the area to be focused varies according to the position relationship between the ball and goal.

It is noted that the area restriction unit 205 may detect, for example, a specific player as the certain subject, as a substitute for the ball. Further, the area around the detected player may be set as the restriction area 501. The restriction area 501 which is set in this manner is an area in which the player is hidden when a virtual advertisement placed inside the restriction area 501 is displayed in the virtual viewpoint image. FIG. 10C illustrates an example in which a restriction area 501 in an elliptic-column shape about the player 1102 is set. In this example, the area restriction unit 205 calculates a motion vector 1103 of the player 1102, and the restriction area 501 is set so that an area in front of the player in the motion direction is wider than an area behind the player. With this configuration, a virtual advertisement can be inserted in the virtual viewpoint image without hiding the particular player with the virtual advertisement.

In this manner, the restriction area 501 to be set may vary according to the position of the certain subject to be captured by the plurality of sensor systems 101. With this configuration, a restriction area 501, which is further appropriate for the condition of the subject, can be set, compared to a case that the restriction area 501 is uniquely set based on the scene specification. Further, the area restriction unit 205 may set a restriction area 501 according to a position of a certain subject regardless of the scene. In other words, the area restriction unit 205 may obtain, as identification information, information that indicates a position of a certain subject detected by an image analysis of the captured image without using the result of the scene detection by the scene setting unit 204, and determine a restriction area 501 based on the identification information. This configuration can restrict the display of a virtual advertisement that overlaps a certain subject in the three-dimensional coordinate system and a virtual object placed near the certain subject, for example.

Further, the above description describes a case that the restriction area 501 to be set is determined regardless of the position of the virtual viewpoint related to the generation of the virtual viewpoint image. This configuration can reduce a case that the viewer is disturbed to focus on the subject since the display of the virtual advertisement frequently changes in response to the movement of the virtual viewpoint. However, in addition to this example, the restriction area 501 may vary according to the position of the virtual viewpoint. Further, the advertisement determining unit 208 may determine whether the virtual advertisement is valid according to the restriction area 501 and the position and posture of the virtual camera 107. For example, among the virtual advertisements placed in the three-dimensional coordinate system, a virtual advertisement, which does not hide the restriction area 501 as seen from the virtual camera 107, may be determined to be valid. On the other hand, a virtual advertisement placed outside the restriction area 501 may be determined to be invalid in a case that the virtual advertisement hides the restriction area 501 as seen from the virtual camera 107.

In this manner, when it is determined whether to activate the virtual advertisement according to the position and posture of the virtual camera 107, the advertisement determining unit 208 determines whether the virtual advertisement hides the restriction area 501 as seen from the virtual camera 107 in S803 of FIG. 8. When it is determined that the virtual advertisement hides the restriction area 501, the process proceeds to S801 and, when it is determined that the virtual advertisement does not hide the restriction area 501, the process proceeds to S805 and the virtual advertisement is determined to be valid.

Figure 11:
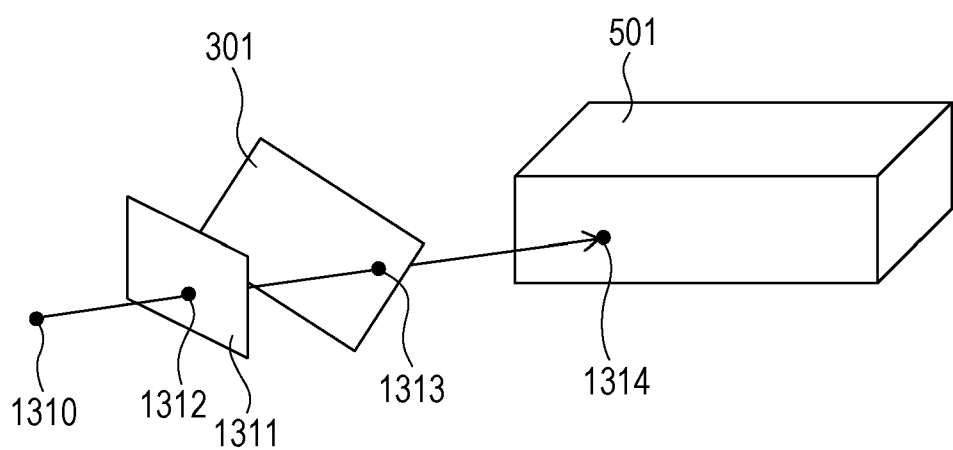
FIG. 11 is a diagram for explaining a determination of whether the virtual advertisement hides the restriction area according to one or more aspects of the present disclosure.

In the determination whether the virtual advertisement hides the restriction area 501, for example, a Z buffer algorithm can be used. With reference to FIG. 11, the method will be described. Firstly, as points to be projected to a point 1312 on an image plane 1311 corresponding to the virtual camera 107, a point 1313 on the advertisement 301 and a point 1314 on the restriction area 501 can be obtained. Next, distances from an optical center 1310 of the virtual camera 107 to the point 1313 and point 1314 are obtained. Then, the above process is repeated for all the points on the image plane 1311. As a result, it is determined that the virtual advertisement hides the restriction area 501 when there is the point 1312 having the distance to the point 1313 shorter than the distance to the point 1314.

Figure 12A:
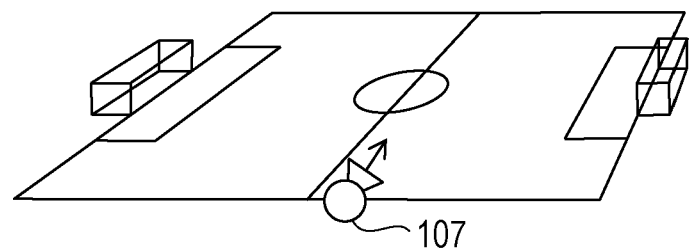
FIGS. 12A to 12C are diagrams for explaining examples of the virtual viewpoint image to which a virtual advertisement is inserted according to one or more aspects of the present disclosure.
Figure 12B:
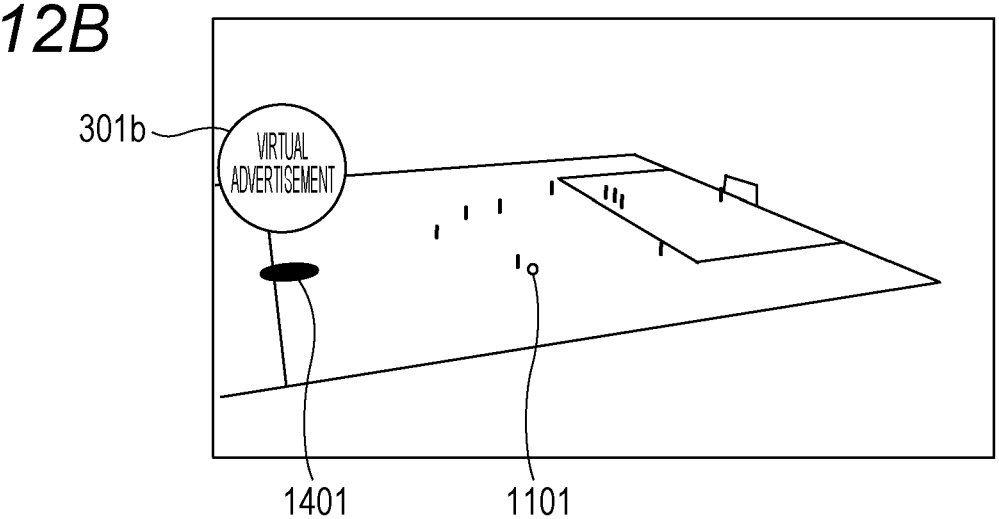
Figure 12C:
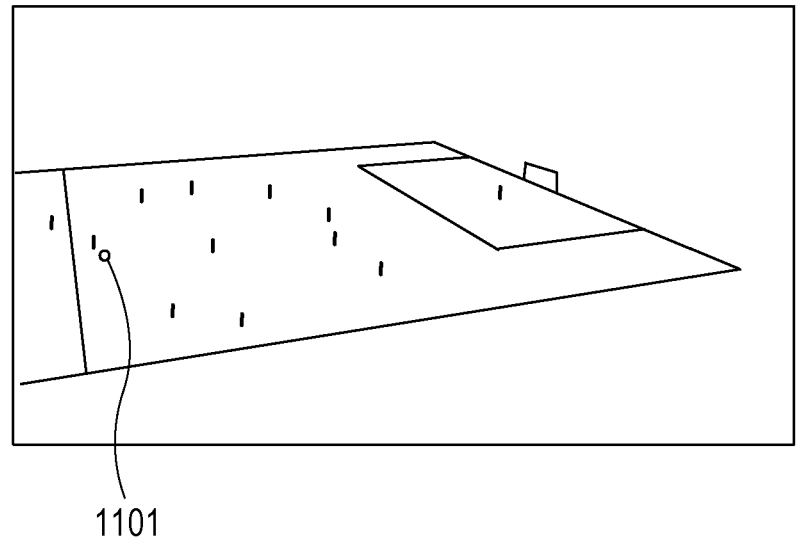

FIGS. 12A to 12C illustrate examples of virtual viewpoint images to which a virtual advertisement is combined. In this case, among the three virtual advertisements of the advertisement 301a, advertisement 301b, and advertisement 301c of FIG. 3A, a virtual advertisement which is determined to be valid is displayed. FIGS. 12B and 12C are both virtual viewpoint images corresponding to the virtual camera 107 illustrated in FIG. 12A.

Figure 10A:
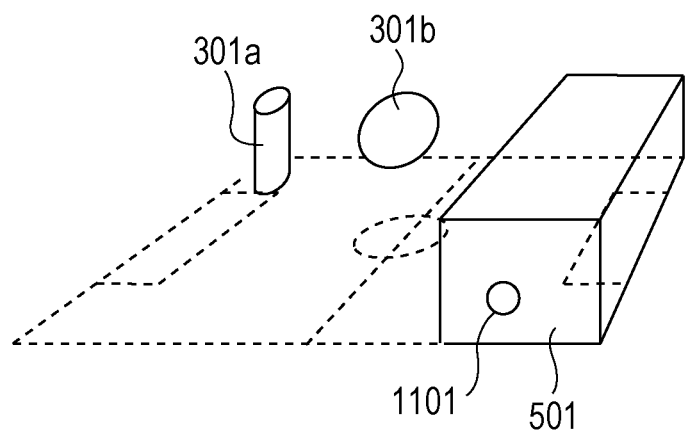
FIGS. 10A to 10C are diagrams for explaining the restriction area which is automatically set according to one or more aspects of the present disclosure.

The scene of FIG. 12B is "FK," and the restriction area 501 illustrated in FIG. 10A is set based on the position of the ball 1101. Thus, the advertisement 301a and advertisement 301b, which do not hide the restriction area 501 as seen from the virtual camera 107, are determined to be valid. Among the virtual advertisements which are determined to be valid, the advertisement 301b placed in the viewing angle of the virtual camera 107 is combined to the virtual viewpoint image.

Figure 10B:
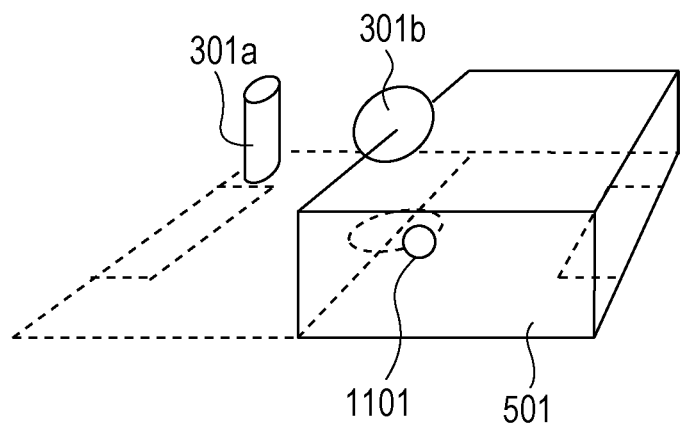
Figure 10C:
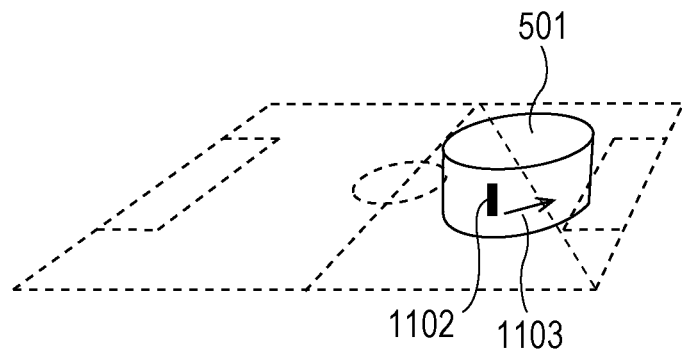

On the other hand, the scene of FIG. 12C is "FK," and the restriction area 501 illustrated in FIG. 10B is set based on the position of the ball 1101. Thus, the advertisement 301a which does not hide the restriction area 501 as seen from the virtual camera 107 is determined to be valid. Among the virtual advertisements which are determined to be valid, since there is no virtual advertisement placed in the view of the virtual camera 107, any virtual advertisement is not combined to the virtual viewpoint image. In the condition of FIG. 12C, the scene and the position of the virtual camera 107 are the same as the condition of FIG. 12B. However, since the position of the ball 1101 is different, the restriction area 501 differs. Thus, the virtual advertisement determined to be valid differs.

Here, as illustrated in FIG. 12B, the advertisement combining unit 209 may combine a shadow 1401 of the virtual advertisement to the virtual viewpoint image. When the shadow 1401 is combined, it helps the viewer to feel as if the virtual advertisement is an advertisement existing in the real space, compared to a case that the shadow 1401 is not combined. The shadow 1401 of the virtual advertisement can be calculated and obtained based on the position of the sun or a light, the position of the stadium, and the position of the virtual advertisement, for example. Further, the shadow 1401 may be simply added at a position just under the virtual advertisement. Here, in addition to the shadow 1401 of the advertisement 301b which is placed in the air, shadows corresponding to the advertisement 301a and advertisement 301b placed on the ground may be added in the virtual viewpoint image.

As described above, the image processing system 10 according to the present embodiment generates a virtual viewpoint image based on a plurality of captured images obtained by capturing images in different angles by the plurality of sensor systems 101 and information corresponding to the specification of a virtual viewpoint. To the virtual viewpoint image generated here, a virtual object which is not included in the plurality of captured images is inserted. Then, the back-end server 104 included in the image processing system 10 obtains identification information for identifying a restriction area 501 set in the three-dimensional coordinate system, that is, a restriction area 501 in which the display of the virtual object is restricted. Further, the back-end server 104 restricts the display, in the virtual viewpoint image, of the virtual object inside the restriction area 501 identified by the obtained identification information.

Such a configuration can reduce a case that the virtual object is displayed in an inappropriate area in the virtual viewpoint image. For example, the display of the virtual object can be restricted to reduce a case that a highly important subject included in the virtual viewpoint image is hidden by the virtual object. Further, for example, the display of the virtual object can be also restricted to reduce a case that the virtual object is placed near an area to be focused and the viewer is disturbed to focus on the area. In other words, the back-end server 104 according to the present embodiment can reduce a case that the visibility of the virtual viewpoint image for the viewer is reduced by the virtual object displayed in the virtual viewpoint image.

The present disclosure can be realized by a process for providing a program that realizes one or more functions of the above embodiment to a system or a device via a network or a recording medium, and reading and executing the program by one or more processors of a computer in the system or device. Further, the present disclosure can be realized by a circuit that realizes one or more of the functions (for example, ASIC or the like). In addition, the program may be recorded in a computer-readable recording medium and provided.

According to the above described embodiment, it can be prevented that a virtual object is displayed in an inappropriate area in the virtual viewpoint image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-074830, filed Apr. 4, 2017, which is hereby incorporated by reference herein in its entirety.

What is claimed is:

1. An image processing apparatus comprising:
one or more memories that store a set of instructions; and
one or more processors that execute the set of instructions to:
obtain respective positions, in a three-dimensional coordinate system, of a plurality of virtual objects to be inserted in a virtual viewpoint image generated based on captured images obtained by a plurality of image capturing devices at different positions, wherein the plurality of virtual objects is not included in the captured images obtained by the plurality of image capturing devices;
specify, based on a result of an image analysis that extracts characteristics from the captured images, a scene of an event captured by the plurality of image capturing devices;
determine, based on the specified scene, a restriction area in which display of the virtual objects is restricted, from among a plurality of candidate areas of the restriction area that are set in the three-dimensional coordinate system; and
control to display a first virtual object for which the obtained position is not included in the determined restriction area and to restrict display of a second virtual object for which the obtained position is included in the determined restriction area, wherein the first virtual object and the second virtual object are included in the plurality of virtual objects.

2. The image processing apparatus according to claim 1, wherein the display of the second virtual object is restricted so that the second virtual object is not displayed in the virtual viewpoint image.

3. The image processing apparatus according to claim 1, wherein the display of the second virtual object is restricted so that transparency of the second virtual object becomes greater than transparency of the first virtual object.

4. The image processing apparatus according to claim 1, wherein the display of the second virtual object is restricted so that a size of the second virtual object becomes smaller than a size of the first virtual object.

5. The image processing apparatus according to claim 1, wherein the event captured by the plurality of image capturing devices is a sport, and wherein the restriction area is determined based on whether the scene of the event is a set play or not.

6. The image processing apparatus according to claim 5, wherein the restriction area is determined based on a type of the set play.

7. The image processing apparatus according to claim 1, wherein the restriction area is determined based on a position of a certain subject captured by the plurality of image capturing devices.

8. The image processing apparatus according to claim 1, wherein the determined restriction area is an area in which a certain subject captured by the plurality of image capturing devices is hidden by a virtual object if the virtual object in the restriction area is displayed.

9. The image processing apparatus according to claim 1, wherein the positions of the plurality of virtual objects in the three-dimensional coordinate system does not change according to a virtual viewpoint corresponding to the virtual viewpoint image.

10. The image processing apparatus according to claim 1, wherein the restriction area is determined regardless of a virtual viewpoint corresponding to the virtual viewpoint image.

11. The image processing apparatus according to claim 1, wherein the virtual objects is used for displaying an advertisement in the virtual viewpoint image.

12. The image processing apparatus according to claim 1, wherein the one or more processors execute the instructions to:
generate the virtual viewpoint image according to the control for restricting of the display of the second virtual object.

13. The image processing apparatus according to claim 12, wherein the one or more processors execute the instructions to:
identify a position of a virtual viewpoint and a sight direction from the virtual viewpoint, and
generate a virtual viewpoint image based on the identified position and the identified sight direction from the virtual viewpoint and based on restriction on the display of the second virtual object.

14. The image processing apparatus according to claim 1, wherein display of the second virtual object is restricted by outputting at least one of information indicating whether to display the second virtual object and a parameter related to display of the second virtual object, to an image generation device that generates the virtual viewpoint image.

15. An image processing method comprising:
- obtaining respective positions, in a three-dimensional coordinate system, of a plurality of virtual objects to be inserted in a virtual viewpoint image generated based on captured images obtained by a plurality of image capturing devices at different positions, wherein the plurality of virtual objects is not included in the captured images obtained by the plurality of image capturing devices;
- specifying, based on a result of an image analysis that extracts characteristics from the captured images, a scene of an event captured by the plurality of image capturing devices;
- determining, based on the specified scene, a restriction area in which display of the virtual objects is restricted, from among a plurality of candidate areas of the restriction area that are set in the three-dimensional coordinate system;
- displaying a first virtual object for which the obtained position is not included in the determined restriction area; and
- restricting display of a second virtual object for which the obtained position is included in the determined restriction area, wherein the first virtual object and the second virtual object are included in the plurality of virtual objects.

16. A non-transitory storage medium that stores a program to cause a computer to execute an image processing method, the image processing method comprising:
- obtaining respective positions, in a three-dimensional coordinate system, of a plurality of virtual objects to be inserted in a virtual viewpoint image generated based on captured images obtained by a plurality of image capturing devices at different positions, wherein the plurality of virtual objects is not included in the captured images obtained by the plurality of image capturing devices;
- specifying, based on a result of an image analysis that extracts characteristics from the captured images, a scene of an event captured by the plurality of image capturing devices;
- determining, based on the specified scene, a restriction area in which display of the virtual objects is restricted, from among a plurality of candidate areas of the restriction area that are set in the three-dimensional coordinate system;
- displaying a first virtual object for which the obtained position is not included in the determined restriction area; and
- restricting display of a second virtual object for which the obtained position is included in the determined restriction area, wherein the first virtual object and the second virtual object are included in the plurality of virtual objects.

* * * * *